US012607483B2

(12) United States Patent
Xu

(10) Patent No.: US 12,607,483 B2
(45) Date of Patent: Apr. 21, 2026

(54) METHOD FOR CONTROLLING TERMINAL DEVICE, STORAGE MEDIUM, GENERAL METER DEVICE AND ELECTRIC METER SYSTEM

(71) Applicant: Autel Digital Power Co., Ltd., Shenzhen (CN)

(72) Inventor: Yunfeng Xu, Shenzhen (CN)

(73) Assignee: Autel Digital Power Co., Ltd., ShenZhen (CN)

( * ) Notice: Subject to any disclaimer, the term of this patent is extended or adjusted under 35 U.S.C. 154(b) by 0 days.

(21) Appl. No.: 18/894,490

(22) Filed: Sep. 24, 2024

(65) Prior Publication Data

US 2025/0012604 A1     Jan. 9, 2025

Related U.S. Application Data

(63) Continuation of application No. PCT/CN2023/073654, filed on Jan. 29, 2023.

(30) Foreign Application Priority Data

Mar. 25, 2022     (CN) ......................... 202210301233.X

(51) Int. Cl.
*G01D 4/02*          (2006.01)

(52) U.S. Cl.
CPC ..................................... *G01D 4/02* (2013.01)

(58) Field of Classification Search
CPC ... Y04S 20/222; Y02B 70/00; Y02B 70/3225; H02J 1/14; H02J 3/14; G01D 4/00; G01D 4/02; G01D 4/10
See application file for complete search history.

(56) References Cited

U.S. PATENT DOCUMENTS

| | | | |
|---|---|---|---|
| 11,211,794 B2 | 12/2021 | Galin et al. | |
| 11,271,399 B1 * | 3/2022 | Sorenson | .................. H02J 1/10 |
| 11,870,186 B2 * | 1/2024 | Lee | ...................... H01R 25/003 |

FOREIGN PATENT DOCUMENTS

| | | | | |
|---|---|---|---|---|
| CN | 106159896 A1 | 11/2016 | | |
| CN | 106505578 A | 3/2017 | | |
| CN | 108075324 A | 5/2018 | | |
| CN | 108363343 A | 8/2018 | | |
| CN | 106505578 B * | 3/2019 | ......... | Y02B 70/3225 |
| CN | 114678841 A | 6/2022 | | |

* cited by examiner

*Primary Examiner* — Franklin D Balseca
(74) *Attorney, Agent, or Firm* — Arch & Lake LLP

(57) ABSTRACT

The present disclosure discloses a method for controlling a terminal device, including: determining power distribution data of a plurality of terminal devices, wherein the power distribution data includes a total power of all sampling time points within a specified time duration, and the total power is a sum of power of the plurality of terminal devices at each of the sampling time points; determining whether the power distribution data meets a power overload condition; in response to determining that the power distribution data meets the power overload condition, controlling each terminal device according to a priority of the plurality of terminal devices.

20 Claims, 5 Drawing Sheets

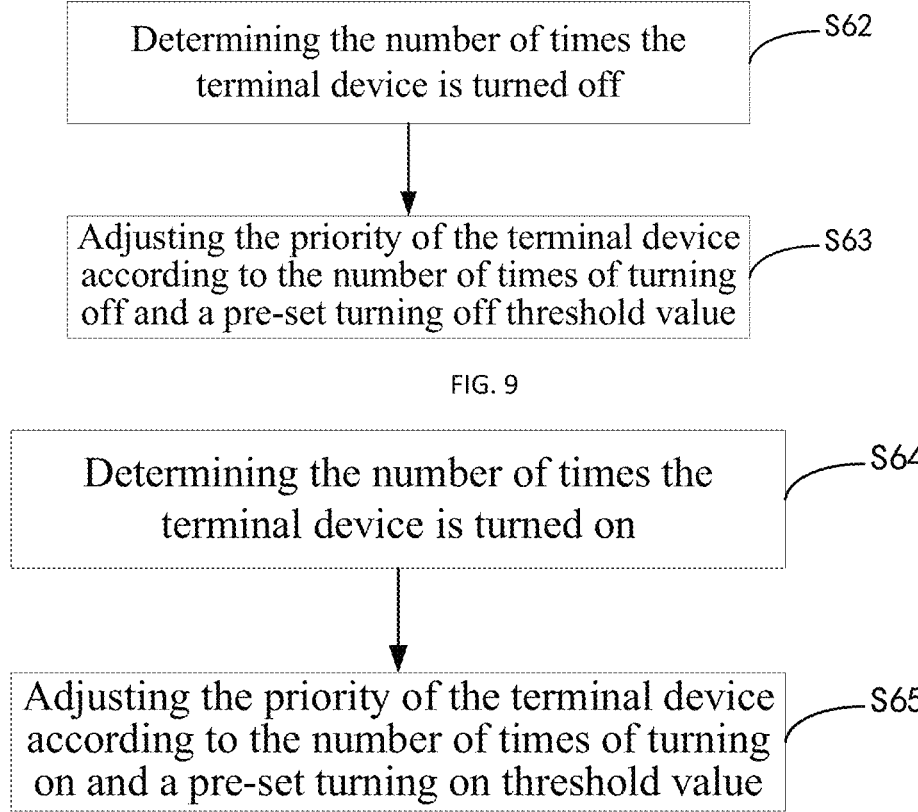

Determining the number of times the terminal device is turned off ⟋—S62

Adjusting the priority of the terminal device according to the number of times of turning off and a pre-set turning off threshold value ⟋—S63

FIG. 9

Determining the number of times the terminal device is turned on ⟋—S64

Adjusting the priority of the terminal device according to the number of times of turning on and a pre-set turning on threshold value ⟋—S65

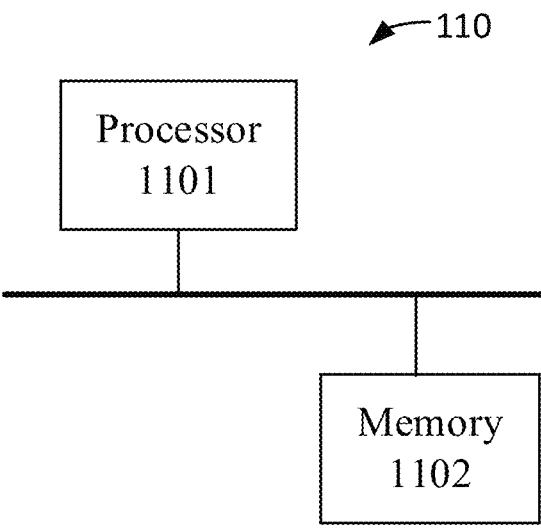

Processor
1101

Memory
1102

FIG. 11

METHOD FOR CONTROLLING TERMINAL DEVICE, STORAGE MEDIUM, GENERAL METER DEVICE AND ELECTRIC METER SYSTEM

CROSS-REFERENCE TO RELATED APPLICATIONS

This application is a continuation application of International Patent Application No. PCT/CN2023/073654 filed on Jan. 29, 2023, which claims the priority of Chinese Patent Application No. 202210301233X, entitled "CONTROL METHOD FOR TERMINAL DEVICE, AND STORAGE MEDIUM, GENERAL METER DEVICE AND ELECTRIC METER SYSTEM", filed on Mar. 25, 2022, the entire disclosures of which are incorporated herein for all purposes.

TECHNICAL FIELD

The present disclosure relates to the technical field of electric meters, and particularly relates to a method for controlling a terminal device, a storage medium, a general meter device and an electric meter system.

BACKGROUND

With the improvement of intelligent electric meter technology, there are more and more application scenarios for the intelligent electric meter. An intelligent electric meter system provided in the related art includes an intelligent electric meter and various terminal devices connected to the intelligent electric meter, where the intelligent electric meter can count circuit parameters of the various terminal devices for later monitoring.

In terms of overload management, when the intelligent electric meter detects that the total power of the power source circuit is greater than the rated power value, all the terminal devices are turned off in an across-the-board manner, which will also discontinue the work of some important terminal devices, thus causing unnecessary disruption to production operations or domestic life.

SUMMARY

An objective of the embodiments of the present disclosure is to provide a method for controlling a terminal device, a storage medium, a general meter device and an electric meter system for solving the problem that overload management of the terminal device is not reasonable enough.

In a first aspect, an embodiment of the present disclosure provides a method for controlling a terminal device, applied to an electric meter system capable of detecting the power of each of the terminal devices, the control method including: determining power distribution data of a plurality of terminal devices, where the power distribution data includes a total power of all sampling time points within a specified time duration, and the total power is a sum of power of the plurality of terminal devices at each of the sampling time points; determining whether the power distribution data meets a power overload condition; and in response to determining that the power distribution data meets the power overload condition, controlling each terminal device according to a priority of the plurality of terminal devices.

In a second aspect, an embodiment of the present disclosure provides a non-volatile computer-readable storage medium storing computer-executable instructions for causing an electronic device to perform the above-mentioned method for controlling a terminal device.

In a third aspect, an embodiment of the present disclosure provides a control apparatus for a terminal device, applied to an electric meter system capable of detecting the power of each of the terminal devices, the control apparatus including: a determining portion configured to determine power distribution data of a plurality of terminal devices, where the power distribution data includes a total power of all sampling time points within a specified time duration, and the total power is a sum of power of the plurality of terminal devices at each of the sampling time points; a judging portion configured to determine whether the power distribution data meets a power overload condition; and a control portion configured to control each terminal device according to a priority of the plurality of terminal devices when the power distribution data meets the power overload condition.

In a fourth aspect, an embodiment of the present disclosure provides a general meter device, including: at least one processor; and a memory in communication connection with the at least one processor; where the memory stores an instruction executable by the at least one processor, and the instruction is executed by the at least one processor to cause the at least one processor to perform the above-mentioned method for controlling a terminal device.

In a fifth aspect, an embodiment of the present disclosure provides an electric meter system, including: at least two branch electric meter devices, each of the branch electric meter devices being used for electrically connecting with a corresponding terminal device; and a general meter device, being electrically connected to each of the branch electric meter devices and being used for sending a control instruction to a corresponding branch electric meter device, so that the branch electric meter device controls the terminal device according to the control instruction.

BRIEF DESCRIPTION OF DRAWINGS

One or more embodiments are illustrated exemplarily by means of figures corresponding thereto in the accompanying drawings, these exemplary illustrations do not constitute limitations of the embodiments, elements in the drawings having the same reference numeral designations represent similar elements, and the figures are not to be limited in scale unless otherwise specified.

FIG. 9 is a schematic flow diagram illustrating a method for controlling a terminal device according to still another embodiment of the present disclosure;

FIG. 10 is a schematic flow diagram illustrating a method for controlling a terminal device according to still another embodiment of the present disclosure; and FIG. 11 is a schematic structural diagram illustrating a circuit of a general meter device according to an embodiment of the present disclosure.

DETAILED DESCRIPTION

For the that the objects, aspects and advantages of the present disclosure may be more clearly understood, a more particular description of the present disclosure, briefly summarized below, may be had by reference to the accompanying drawings and embodiments. It should be understood that the particular embodiments described herein are illustrative only and are not restrictive. Based on the embodiments in the present disclosure, all other embodiments obtained are within the scope of protection of the present disclosure.

It should be noted that, if not in conflict, the various features of the embodiments of the present disclosure may be combined. In addition, although the division of functional modules is illustrated in a schematic diagram showing an apparatus and a logical order is illustrated in a flowchart, in some cases, the steps illustrated or described may be performed in an order other than the division of the modules the apparatus or in the flowchart. Furthermore, the words "first," "second," "third," and the like, as used herein do not limit the data and order of execution, but merely distinguish the same item or similar item having substantially the same function or action.

Figures 1, 2:
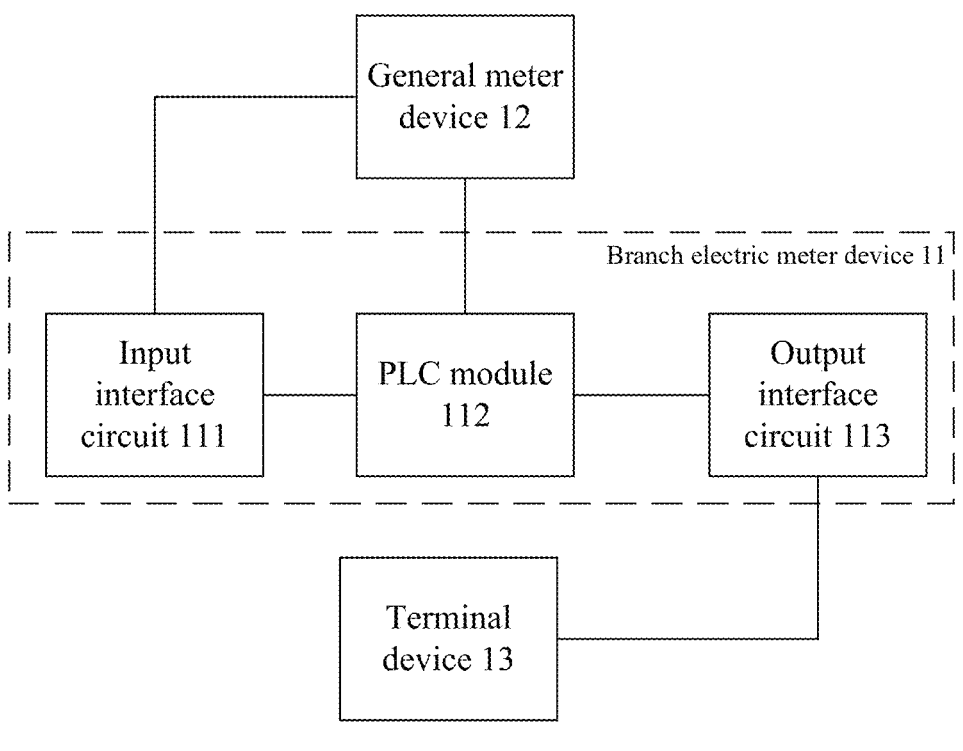
FIG. 1 is a schematic structural diagram of an electric meter system according to an embodiment of the present disclosure.
FIG. 2 shows a first topological structure of branch electric meter devices and terminal devices according to an embodiment of the present disclosure.

An embodiment of the present disclosure provides an electric meter system, and referring to FIG. 1, the electric meter system includes a branch electric meter device 11 and a general meter device 12, where the number of branch electric meter devices 11 may be one or more.

The branch electric meter device 11 is used for electrically connecting with a corresponding terminal device 13, where the branch electric meter device 11 may not only turn off or turn on the terminal device 13, but also calculate operating parameters of the terminal device 13, where the operating parameters include active power, reactive power, apparent power, voltage effective value, current effective value, power factor, phase angle, waveform, zero crossing detection, over-voltage and over-current detection, under-voltage and under-current detection, phase sequence detection, etc.

In some embodiments, the branch electric meter device 11 includes an input interface circuit 111, a PLC module 112 and an output interface circuit 113, where the PLC module 112 is electrically connected to the input interface circuit 111 and the output interface circuit 113, respectively.

The input interface circuit 111 is used to input power and may also be electrically connected to the general meter device 12, where the input interface circuit 111 may convert on-site switching value signals to standard signals internal to the PLC module 112.

The PLC module 112 performs corresponding operation logics according to the switching value signal of the input interface circuit 111 and generates a switching control signal.

The output interface circuit 113 is used for electrically connecting with the terminal device 13, and operating in a turning-off state or a conductive state according to the switching control signal of the PLC module 112 to control the turning off or conduction of the power supply loop of the terminal device 13.

It will be appreciated that the topological structure of the branch electric meter devices and the terminal devices may be the topology shown in FIG. 2, i.e., one branch electric meter device manages one terminal device.

Figures 3, 4:
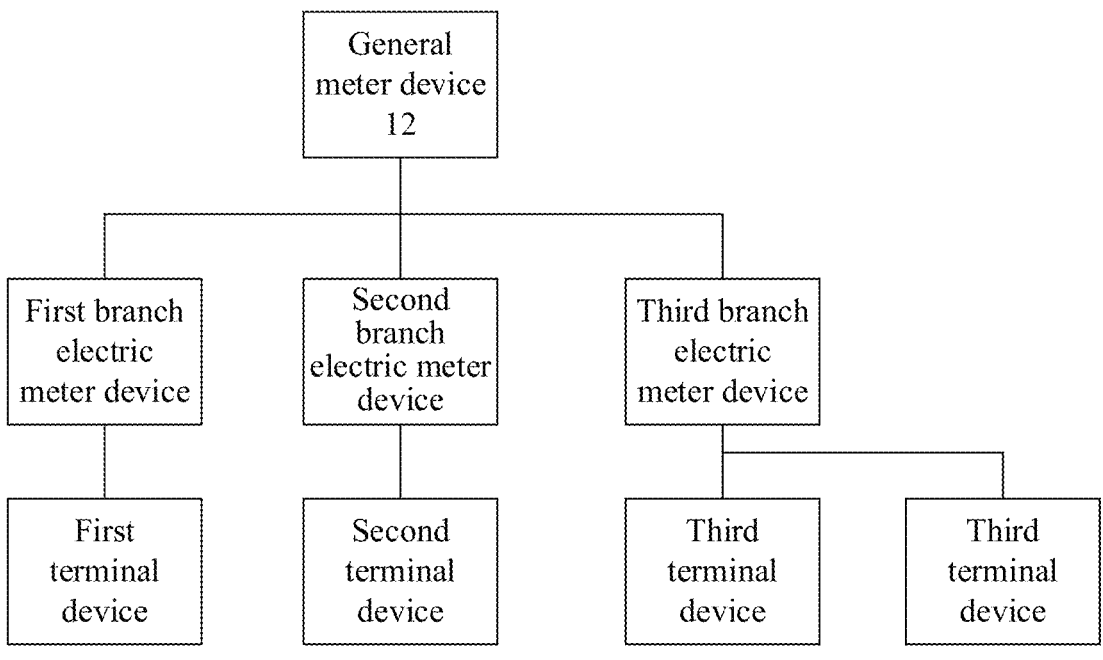
FIG. 3 shows a second topological structure of branch electric meter devices and terminal devices according to an embodiment of the present disclosure.
FIG. 4 is a schematic structural diagram of an electric meter system according to another embodiment of the present disclosure.

It will be appreciated that the topological structure of the branch electric meter device and the terminal device may be the topology shown in FIG. 3, i.e., one branch electric meter device may manage two or more terminal devices.

It will be appreciated that the terminal device 13 may be any type of device, such as a household appliance including an air fryer of, an air conditioner, a dry washer, a washing machine, an electric radiator device, etc.

The general meter device 12 serves as a control core of the electric meter system, and the general meter device 12 is electrically connected to each branch electric meter device for sending a control instruction to the corresponding branch electric meter device, so that the branch electric meter device controls the terminal device according to the control instruction. In addition, the general meter device 12 is also able to communicate with the individual branch electric meter devices 11 to count the operating parameters of the individual terminal devices.

The general meter device 12 may summarize parameters according to the working parameters fed back by each branch electric meter device 11, and the summarized parameters are as shown in Table 1.

TABLE 1

| Terminal device | Power | Relative power | Full load relative power | Switch state |
|---|---|---|---|---|
| Kitchen | 3025 w | 30.25% | 15.12% | On |
| Air conditioner | 2067 w | 20.67% | 10.33% | On |
| Clothes dryer | 1012 w | 10.12% | 5.06% | On |
| Washing machine | 1 w | 0.01% | 0.01% | Off |
| Electric radiator | 0 w | 0.00% | 0.00% | On |

In addition, the general meter device 12 may also transmit an external power to the branch electric meter device 11, which in turn transmits it to the terminal device 13.

In some embodiments, the general meter device 12 is configured with a communication module for communicating with an intelligent terminal 14. For example, referring to FIG. 4, the intelligent terminal 14 may communicate with the general meter device 12 and send configuration information to the general meter device 12, and the general meter device 12 completes local configuration of corresponding operations according to the configuration information, or the general meter device 12 sends feedback information to the intelligent terminal 14, and the intelligent terminal 14 analyses and processes the feedback information.

Two examples are provided below to illustrate two aspects of the electric meter system, it can be appreciated that the following examples are not intended to limit the scope of the present disclosure in any way.

Example 1: referring to FIG. 3, the intelligent terminal 14 sends a control instruction to the general meter device 12 for instructing the first branch electric meter device to enter a turning-off state. The general meter device 12 sends a control instruction to the first branch electric meter device via the PLC line, and according to the control instruction, the first branch electric meter device closes the strong-current relay of the output interface circuit thereof, so that the power supply loop of the first terminal device is in a turning-off state, and then the first terminal device stops working.

Example 2: referring to FIG. 3, the intelligent terminal 14 sends configuration information to the general meter device 12 for configuring the overload current of the first branch electric meter device to be 5A. When the first branch electric meter device detects that the current flowing through the first terminal device is excessive, the first branch electric meter apparatus closes the power supply loop of the first terminal device and transmits over-current abnormality information to the general meter device 12.

Figure 5:
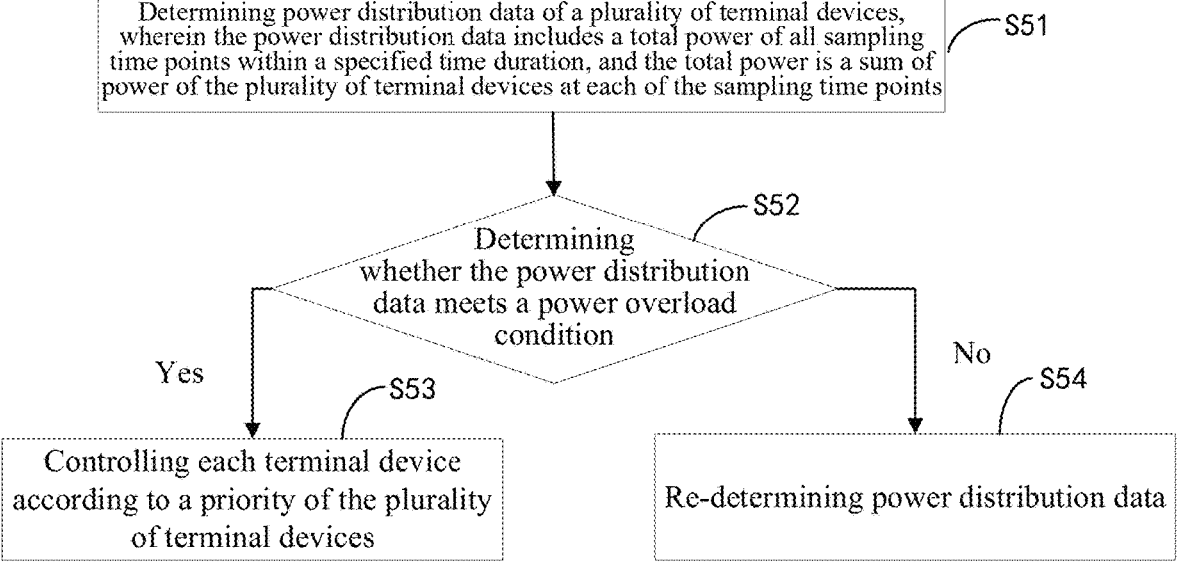
FIG. 5 is a schematic flow diagram illustrating a method for controlling a terminal device according to an embodiment of the present disclosure.

An embodiment of the present disclosure provides a method for controlling a terminal device, which is applied to an electric meter system, and the electric meter system may detect the power of each terminal device, where referring to FIG. 5, the method for controlling a terminal device includes:

S51: determining power distribution data of a plurality of terminal devices, where the power distribution data includes a total power of all sampling time points within a specified time duration, and the total power is a sum of power of the plurality of terminal devices at each of the sampling time points.

In some embodiments, the S51 includes: acquiring the power of each terminal device at each of the sampling time points, calculating the sum of the powers returned by each terminal device at each of the sampling time points to obtain the total power at each of the sampling time points, and taking the total power within a specified time duration as the power distribution data.

In some embodiments, the acquiring the power of each terminal device at each of the sampling time points includes: sending a power sampling instruction to each branch electric meter device, so that each of the branch electric meter devices samples the power of the corresponding terminal device, and acquiring the power at each of the sampling time points sent by each the branch electric meter device.

The power distribution data may represent the distribution condition of the total power at each of the sampling time points within a specified time duration, for example, the power distribution data includes the total power falling within each overload gear, where the overload gear includes a first overload gear with 0-200 kw, a second overload gear with 200 kw-250 kw, a third overload gear with 250 kw-300 kw and a fourth overload gear with 300 kw-∞, and it can be seen from the power distribution data that the total power at each of the sampling time points is distributed in the corresponding overload gears.

The specified time duration is determined by the time duration defined from the start time point to the end time point, where the specified time duration may be customized by the user based on engineering experience, such as 1 minute (equivalent to 60 seconds) or 1 day (equivalent to 86400 seconds) or 7 days (equivalent to 604800 seconds).

In some embodiments, the start time point may be a specified time point and the end time point may be a time point corresponding to a specified time duration having an interval with the specified time point, for example, the time axis may include a time point t0, a time point tm, a time point t1, a time point t2, a time point tn, and a time point t3, where $t3-t2=t2-t1=t1-t0=\Delta t=tn-tm=$the specified time duration. The designer may set the time point t0 or time point tm or time point t1 to a specified time point. When the time point t0 is a start time point, and the time point t1 is an end time point, then the specified time duration is equivalent to the duration of the time point t0–the time point t1. When the time point tm is a start time point, and the time point tn is an end time point, then the specified time duration is equivalent to the duration of the time point tn–the time point tm. When the time point t1 is a start time point, and the time point t2 is an end time point, then the specified time duration is equivalent to the duration of the time point t1–the time point t2.

As previously stated, when the user sets the specified time duration as 86400 seconds, and the time point when the general meter device starts to work is the $0^{th}$ second, i.e., the start time point is the $0^{th}$ second, after 86400 seconds have elapsed, the $86400^{th}$ second are the end time point; therefore, the time duration from the $0^{th}$ second to the $86400^{th}$ second is the specified time duration, the general meter device may acquire the total power from the $0^{th}$ second to the $86400^{th}$ seconds and use the total power from the $0^{th}$ second to the $86400^{th}$ seconds as the power distribution data.

The sampling time point is a time point for sampling the power used by the terminal device, for example, referring to FIG. 3, the first branch electric meter device samples the power used by the first terminal device according to a pre-set period, for example, the pre-set period is 0.01 s/time and the pre-set frequency is 100 times/s; when the time point at which the electric meter system starts to sample the power distribution data is w0, the $n^{th}$ sampling time point is wo+n*F, where n is a positive integer and F is a pre-set period, where F=0.01 s/time.

The first branch electric meter device samples a power of the first terminal device at each of the sampling time points, and similarly, the second branch electric meter device also samples a power of the second terminal device at each of the sampling time points, and the third branch electric meter device also samples a power of the third terminal device at each of the sampling time points.

The sum of powers is a sum of powers of each terminal device at each of the sampling time points; as previously stated, with regard to the sampling time point ts, the first branch electric meter device feeds back the power p1 at the sampling time point ts, the second branch electric meter device feeds back the power p2 at the sampling time point ts and the third branch electric meter device feeds back the power p3 at the sampling time point ts to the general meter device, and the general meter device adds the power p1, the power p2 and the power p3 so as to obtain the total power p=p1+p2+p3 at the sampling time point ts.

S52: determining whether the power distribution data meets a power overload condition.

The power overload condition is a condition for indicating whether the electric meter system is in a power overload state, where the power overload condition may be customized by a user according to engineering experience, for example, the power overload condition is set to: the ratio of the total number of power greater than or equal to the overload power threshold occupying the total number of power distribution data is greater than or equal to a pre-set overload ratio, or the average total power of the power distribution data is greater than or equal to the overload power threshold.

S53: in response to determining that the power distribution data meets the power overload condition, controlling each terminal device according to the priority of the terminal device.

In this step, the priority is used to indicate the importance level of each terminal device, where the lower the importance of the terminal device, the lower the priority, and the higher the importance of the terminal device, the higher the priority. The lower the priority, the more easily the terminal device is turned off, and the higher the priority, the less easily the terminal device is turned off, e.g., the terminal device may be configured as a first priority, a second priority, a third priority, a fourth priority, etc. of decreasing priority, where the general meter device first switches off the terminal device of the fourth priority. After all the terminal devices of the fourth priority are turned off, if more terminal devices need to be turned off, the terminal devices of the third priority are turned off. After all the terminal devices of the third priority have been turned off, if more terminal devices need to be turned off, the terminal devices of the second priority are turned off. After all the terminal devices of the second priority are turned off, if more terminal devices need to be turned off, the terminal devices of the first priority are turned off.

In some embodiments, the intelligent terminal sends priority configuration information to the general meter device, where the priority configuration information includes a priority of each terminal device. The general meter device determines the priority of the branch electric meter device corresponding to each terminal device according to the priority configuration information; since the branch electric meter device is in a corresponding relationship with the terminal device, the priority of the terminal device may be mapped to the priority of the branch electric meter device electrically connected thereto; subsequently, the general meter device controls the turning off of the branch electric meter devices according to the priority configuration information so as to control the turning off of the terminal devices.

It will be appreciated that in some embodiments, branch electric meter devices may be omitted in the topological structure of the electric meter system, i.e., the general meter device is directly connected to the terminal devices, or the method provided herein may be used to control the operating state of the terminal devices.

In this embodiment, if the power distribution data meets the power overload condition, the general meter device controls each terminal device according to the priority of the terminal device, for example, when the power distribution data from the $0^{th}$ second to the $86400^{th}$ second meets the power overload condition, the general meter device turns off the terminal devices with a low priority via the branch electric meter devices, and keeps the terminal devices with a high priority in an operating state.

S54: in response to determining that the power distribution data does not meet the power overload condition, re-determining the power distribution data.

In this step, when the power distribution data does not meet the power overload condition, the general meter device re-determines the power distribution data; for example, when the power distribution data from the $0^{th}$ second to the $86400^{th}$ second does not meet the power overload condition, the general meter device continues to acquire the power distribution data from the $86401^{th}$ second to the $172,800^{th}$ second, i.e., returning to step S51.

Compared with the related art, according to the method for controlling a terminal device provided by an embodiment of the present disclosure, power distribution data of a plurality of terminal devices is determined, where the power distribution data includes a total power of all sampling time points within a specified time duration, and the total power is the sum of power of the plurality of terminal devices at each of the sampling time points; whether the power distribution data meets a power overload condition is determined; and when the power distribution data meets the power overload condition, each terminal device is controlled according to a priority of the plurality of terminal devices. In general, in this embodiment, whether the power distribution data meets a power overload condition may be determined by analyzing the power distribution data to control the operating state of each terminal device; therefore, by means of the control method, the turning on/turning off of terminal devices may be scientifically and rationally managed in the case of an overload, and the terminal devices are intelligently managed, thereby avoiding the unnecessary disruption to production operations or domestic life by turning off all the terminal devices in an across-the-board manner, and thus facilitating the improvement of the user experience.

In some embodiments, when determining whether the power distribution data meets the power overload condition, the S52 includes: calculating an average total power according to the power distribution data, and determining whether a power overload condition is met according to the average total power and a pre-set total power.

In some embodiments, the calculating the average total power according to the power distribution data includes: summing all the total powers in the power distribution data to obtain an added result, and dividing the summed result by the total number of the total powers of the power distribution data to obtain an average total power.

In some embodiments, the determining whether a power overload condition is met according to the average total power and a pre-set total power includes: determining whether the average total power is greater than or equal to a pre-set total power; if so, it meets the power overload condition, and if not, it does not satisfy the power overload condition.

Figure 6:
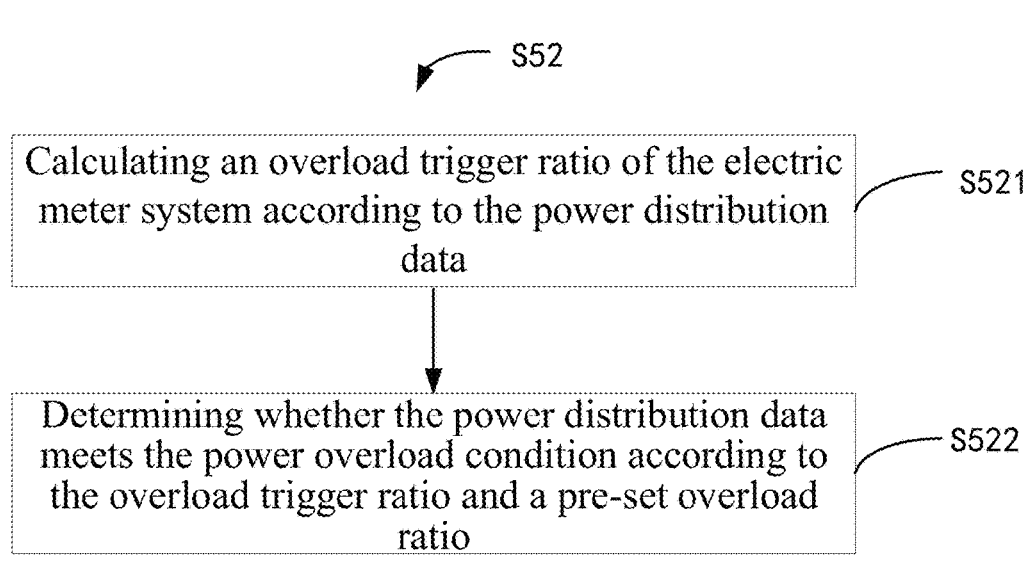
FIG. 6 is a schematic flow diagram of S52 shown in FIG. 5.

In some embodiments, in determining whether the power distribution data meets the power overload condition, unlike the above-described embodiments, referring to FIG. 6, the S52 includes:

S521: calculating an overload trigger ratio of the electric meter system according to the power distribution data;

S522: determining whether the power distribution data meets the power overload condition according to the overload trigger ratio and the pre-set overload ratio.

In the S521, the overload trigger ratio is a ratio for indicating whether to turn off the terminal device.

In some embodiments, the S521 includes: determining the target number and the total number of the total power according to the power distribution data, where the target number is a total number of the total power greater than the overload power threshold, and calculating an overload trigger ratio according to the total number and the target number.

In some embodiments, the determining the target number and the total number of total power according to the power distribution data includes: traversing a reference total power of which the total power is greater than the overload power threshold in the power distribution data, accumulating the number of the reference total power to obtain a target number, and counting the number of all the total powers in the power distribution data to obtain a total number.

In some embodiments, the overload power threshold, the specified time duration, and the pre-set overload ratio are correlated, if the overload power threshold is greater, the specified time duration is shorter and the pre-set overload ratio is greater.

For example, if the overload power threshold is 200 kw, the specified time duration selected is 7 days (604800 seconds) and the pre-set overload ratio is 10%. With an overload power threshold of 250 kw, the specified time duration selected is 1 day (86400 seconds) with a pre-set overload ratio of 20%. When the overload power threshold is 300 kw, the specified time duration selected is 1 minute (60 seconds) and the pre-set overload ratio is 50%.

Since the greater the overload power threshold, the shorter the specified time duration, the easier the general meter device to capture the short-term change of the larger power, and under the condition that the corresponding pre-set overload ratio is relatively large, even if there is a short-term high power, in order to avoid frequently triggering the operation of turning off the terminal device, it is also necessary to meet the premise of a higher confidence level to trigger the operation of turning off the terminal device, thereby improving the reliability of the system.

In some embodiments, the S522 includes: determining whether the overload trigger ratio is greater than or equal to a pre-set overload ratio; and if so, it meets a power overload condition, and if not, it does not meet the power overload condition.

Figure 7:
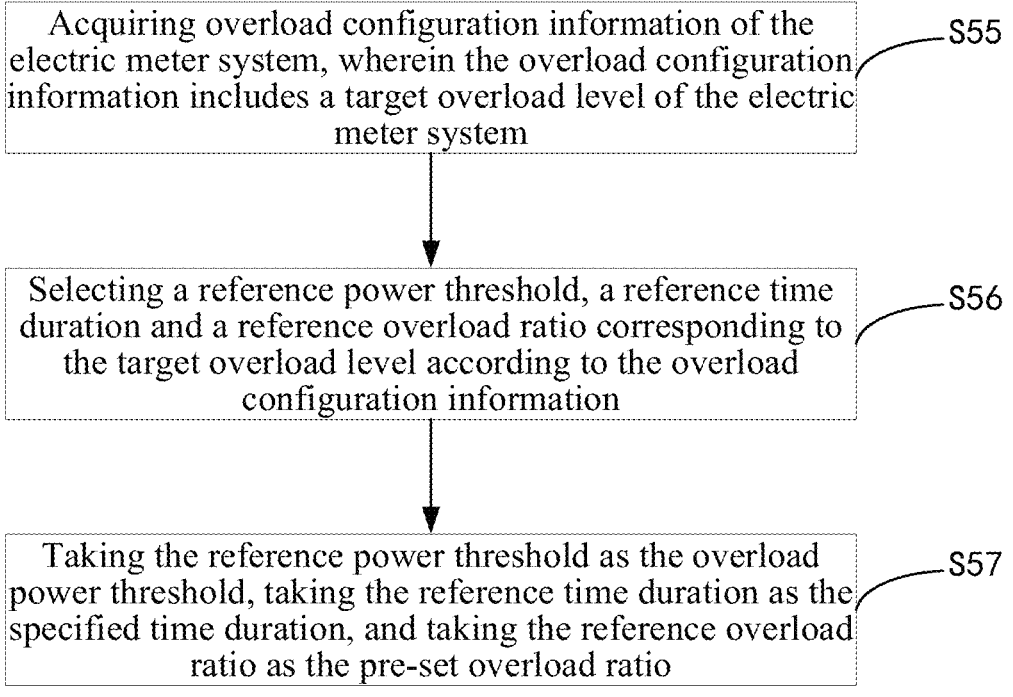
FIG. 7 is a schematic flow diagram illustrating a method for controlling a terminal device according to another embodiment of the present disclosure.

In some embodiments, before determining the power distribution data, referring to FIG. 7, the method for controlling the terminal device further includes:

S55: acquiring overload configuration information of the electric meter system, where the overload configuration information includes a target overload level of the electric meter system.

S56: selecting a reference power threshold, a reference time duration and a reference overload ratio corresponding to the target overload level according to the overload configuration information.

S57: taking the reference power threshold as the overload power threshold, taking the reference time duration as the specified time duration, and taking the reference overload ratio as the pre-set overload ratio.

In the S55, the overload configuration information may be sent by the intelligent terminal to the meter device, where the overload configuration information is information for configuring the general meter device to select a corresponding overload management strategy. The overload level is a level used to indicate that the general meter device manages the electric meter system in an overload situation, where the overload level may be customized by a user, and in some embodiments, the overload level includes a first overload level, a second overload level and a third overload level, and the target overload level is one overload level of a plurality of overload levels.

In the S56, the user configures corresponding relationships of multiple sets of overload levels, reference power thresholds, reference time duration and reference overload ratios in the general meter device in advance.

For example, when the overload level is the first overload level, the reference power threshold is 200 kw, the reference time duration is 7 days (604800 seconds), and the reference overload ratio is 10%. When the overload level is the second overload level, the reference power threshold is 250 kw, the reference time duration is 1 day (86400 seconds), and the reference overload ratio is 20%. When the overload level is the third overload level, the reference power threshold is 300 kw, the reference time duration is 1 minute (60 seconds), and the reference overload ratio is 50%.

In the S57, when the target overload level is the first overload level, the reference power threshold is 200 kw, the reference time duration is 7 days (604800 seconds), and the reference overload ratio is 10%, therefore, when the power distribution data is subsequently determined, the power distribution data includes the total power at each of the sampling time points within 7 days. The calculation of the overload trigger ratio is based on a target number of total power greater than 200 kw. When it is determined whether the overload trigger ratio is greater than or equal to the pre-set overload ratio, it is actually determined whether the overload trigger ratio is greater than or equal to 10%.

By the same reasoning, when the target overload level is the second overload level, the reference power threshold is 250 kw, the reference time duration is 1 day (86400 seconds), and the reference overload ratio is 20%, and therefore, when the power distribution data is subsequently determined, the power distribution data includes the total power at each of the sampling time points within 1 day. The calculation of the overload trigger ratio is based on a target number of total power greater than 250 kw. When it is determined whether the overload trigger ratio is greater than or equal to the pre-set overload ratio, it is actually determined whether the overload trigger ratio is greater than or equal to 20%.

When the target overload level is the third overload level, the reference power threshold is 300 kw, the reference time duration is 1 minute (60 seconds), and the reference overload ratio is 50%, so when the power distribution data is subsequently determined, the power distribution data includes the total power at each of the sampling time points within 1 minute. The calculation of the overload trigger ratio is based on a target number of total power greater than 300 kw. When it is determined whether the overload trigger ratio is greater than or equal to the pre-set overload ratio, it is actually determined whether the overload trigger ratio is greater than or equal to 50%.

In some embodiments, when controlling each terminal device according to the priority of the terminal device, the S53 includes: progressively turning off each terminal device in a priority order of from low to high, Therefore, in this embodiment, the terminal devices may be differentially turned off, so as to maintain the terminal device with higher importance in an operating state while turning off the terminal device with lower importance, to improve the robustness and user experience of the system.

In some embodiments, the progressively turning off each terminal device in a priority order of from low to high includes: searching for the terminal device with the lowest priority among all the terminal devices currently in the operating state, and turning off the terminal device with the lowest priority.

In some embodiments, after turning off the terminal device with the lowest priority, the method for controlling a terminal device further includes: clearing power distribution data corresponding to the specified time duration, and proceeding to determine the power distribution data; therefore, in this embodiment, what is needed is only the power distribution data of the specified time duration to perform overload monitoring without requiring a large historical data to participate in the calculation, thereby increasing the real-time performance of the system and improving the calculation efficiency.

For example, in conjunction with FIG. 3, the priority of the first terminal device is a first priority, the priority of the second terminal device is a second priority, and the priority of the third terminal device is a third priority, where the overload level of the electric meter system is configured to a second overload level by the user, that is to say: the reference power threshold is 250 kw, the reference time duration is 1 day (86400 seconds), and the reference overload ratio is 20%.

In the first specified time duration from the $0^{th}$ second to the $86400^{th}$ second, the general meter device calculates an overload trigger ratio of 30% according to the power distribution data; since the overload trigger ratio of 30% is greater than the pre-set overload ratio of 20%, the power distribution data from the $0^{th}$ second to the $86400^{th}$ second meets a power overload condition, the general meter device turns off each terminal device step by step according to a priority order from low to high; specifically, among various terminal devices in an operating state, the general meter device searches for a terminal device with the lowest priority.

As shown in FIG. 3, since the first terminal device, the second terminal device and the third terminal device are all in an operating state, and the priority of the third terminal device is the lowest, the general meter device searches out that the third terminal device is the terminal device with the lowest priority, and thus turns off the third terminal device. After the general meter device turns off the third terminal device, the power distribution data corresponding to the specified time duration is cleared, for example, the power distribution data from the $0^{th}$ second to the $86400^{th}$ second is cleared, and the power distribution data is re-determined then.

In the second specified time duration from the $86401^{th}$ second to the $172,800^{th}$ second, the general meter device calculates an overload trigger ratio of 50% according to the power distribution data; since the overload trigger ratio of 30% is greater than the pre-set overload ratio of 20%, the power distribution data from the $86401^{th}$ second to the $172,800^{th}$ second meets a power overload condition, the general meter device turns off each terminal device step by step according to a priority order from low to high; specifically, among various terminal devices in an operating state, the general meter device searches for a terminal device with the lowest priority.

As shown in FIG. 3, since the third terminal device has been turned off, the first terminal device and the second terminal device are still in an operating state, and between the first terminal device and the second terminal device, the priority of the second terminal device is the lowest; therefore, the general meter device searches out that the second terminal device is the terminal device with the lowest priority, and thus turns off the second terminal device. After the general meter device turns off the second terminal device, the power distribution data corresponding to the specified time duration is cleared, for example, the power distribution data from the $86401^{th}$ second to the $172,800^{th}$ second is cleared, and the power distribution data is re-determined then, and so on.

Figure 8:
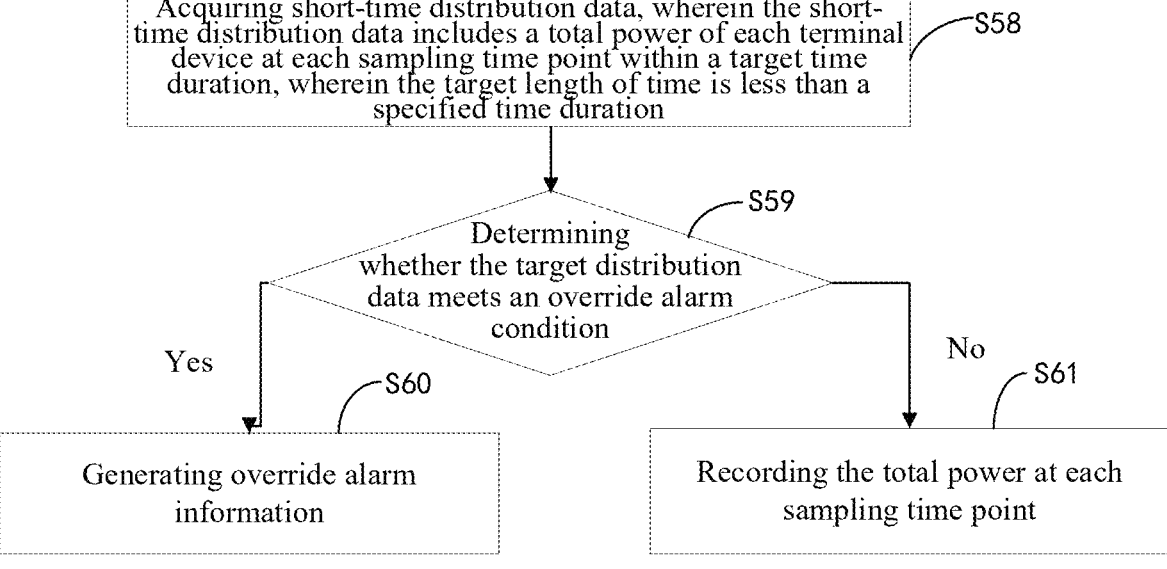
FIG. 8 is a schematic flow diagram illustrating a method for controlling a terminal device according to still another embodiment of the present disclosure.

In some embodiments, after turning off the terminal device with the lowest priority, referring to FIG. 8, the method for controlling a terminal device further includes:

S58: acquiring short-time distribution data, where the short-time distribution data includes the total power of each terminal device at each of the sampling time points within a target time duration, where the target time duration is less than a specified time duration.

S59: determining whether the short-time distribution data meets an override alarm condition.

S60: in response to determining that the short-time distribution data meets the override alarm condition, generating override alarm information.

S61: in response to determining that the short-time distribution data does not meet the override alarm condition, recording the total power at each of the sampling time points.

In the S58, the short-time distribution data may represent the distribution of the total power at each of the sampling time points within the target time duration, for example, the overload level of the electric meter system is the first overload level; as previously stated, if the specified time duration is 7 days (604800 seconds), the target time duration is 1 day, and the short-time distribution data is the total power of each terminal device at each of the sampling time points within 1 day. The overload level of the electric meter system is the second overload level; as previously stated, when the specified time duration is 1 day (86400 seconds), the target time duration is 1 hour, and the short-time distribution data is the total power of each terminal device at each of the sampling time points within 1 hour. The overload level of the electric meter system is the third overload level; as previously stated, if the specified time duration is 1 minute (60 seconds), the target time duration is 15 seconds, and the short-time distribution data is the total power of each terminal device at each of the sampling time points within 15 seconds.

In some embodiments, when determining whether the short-time distribution data meets the override alarm condition, the S59 includes: according to the short-time distribution data, determining whether the total power in a continuous pre-set time duration is greater than or equal to the overload power threshold, if so, it meets the override alarm condition, and if not, not it does not meet the override alarm condition. For example, the pre-set time duration is 5 minutes, and the target overload level is a second overload level; and if the total power in the continuous 5 minutes and is greater than 250 kw, the override alarm condition is met. If the total power is intermittently greater than 250 kw or always less than 250 kw, the override alarm condition is not met.

In contrast to the above-described embodiment, when it is determined whether the short-time distribution data meets the override alarm condition, the S59 includes: according to the short-time distribution data, calculating the target trigger ratio, and according to the target trigger ratio and the pre-set overload ratio, determining whether the override alarm condition is met.

In some embodiments, the calculating the target trigger ratio according to the short-time distribution data includes: according to the short-time distribution data, determining the number of override alarms and the total number of override alarms, where the number of override alarms is the sum of the number of total powers greater than the overload power threshold; and calculating the target trigger ratio according to the number of override alarms and the total number of override alarms.

In some embodiments, the determining whether the override alarm condition is met according to the target trigger ratio and the pre-set overload ratio includes: determining whether the target trigger ratio is greater than or equal to the pre-set overload ratio.

In the S60, if the short-time distribution data meets the override alarm condition, the general meter device generates the override alarm information, for example, the general meter device sends the override alarm information to the intelligent terminal, and the override alarm information is used for prompting the user to manually turn off the corresponding terminal device in an operating state, where the override alarm information may be any form of alarm information, such as voice alarm information, short message notification information or flashing alarm information.

In the S61, if the short-time distribution data does not meet the override alarm condition, the general meter device records the total power at each of the sampling time points, for example, the pre-set time duration is 5 minutes, and the target overload level is the second overload level; since the total power is intermittently greater than 250 kw, the short-time distribution data does not meet the override alarm condition, and the general meter device needs to calculate the total power at each of the sampling time points after 5 minutes.

When the terminal device is turned off according to the specified time duration, it is considered that the power overload may continue or the power overload phenomenon may not be completely and reliably eliminated. Therefore, with respect to the specified time duration, since in this embodiment, short-time distribution data of a shorter target time duration may be intercepted to make an early judgement, the power overload monitoring may be performed more reliably, thereby improving the reliability of the power overload monitoring.

In some embodiments, referring to FIG. 9, the method for controlling a terminal device further includes:

S62: determining the number of times the terminal device is turned off.

S63: adjusting the priority of the terminal device according to the number of times of turning off and a pre-set turning off threshold.

In the S62, the number of times of turning off is the number of times that the terminal device is turned off after the override alarm information is generated; in some embodiments, after the override alarm information is generated, the general meter device monitors the operating state of the terminal device, selects the terminal device entering the turning-off state from the turning-on state as the reference device, and accumulates the number of times of turning off the reference device, for example, each time after the override alarm information is generated by the general meter device, the general meter device monitors which terminal device in the turning-on state is manually turned off by the user, and records the number of times of turning off the terminal device.

In the S63, the pre-set turning off threshold may be customized by the user based on engineering experience.

In some embodiments, the S63 includes: determining whether the number of times of turning off is greater than or equal to a pre-set turning off threshold; if so, reducing the priority of the terminal device, and if not, maintaining the priority of the terminal device.

For example, in conjunction with FIG. 3, the original priority of the first terminal device is the first priority, the pre-set number of times of turning off is three, and when the first override alarm information occurs, the first terminal device is manually turned off once by the user, and then the general meter device records 1. When the second override alarm information occurs, the first terminal device is manually turned off once by the user, whereupon the general meter device records 2. When the third override alarm information occurs, the first terminal device is manually turned off once by the user, and then the general meter device records 3, and since the number of times of turning off is equal to the pre-set turning off threshold, the general meter device reduces the priority of the first terminal device from the first priority to the second priority.

In this embodiment, the user's habit of turning off the corresponding terminal device is learned, and the turning off and turning on of the corresponding terminal device according to the user's habit is controlled, so that the overload monitoring strategy may be more in line with the user's habit, thereby improving the intelligence of the electric meter system and improving the user's experience.

In some embodiments, referring to FIG. 10, the method for controlling a terminal device further includes:

S64: determining the number of times the terminal device is turned on.

S65: adjusting the priority of the terminal device according to the number of times of turning on and a pre-set turning on threshold.

In the S64, the number of times of turning on is the number of times that the terminal device is manually turned on again after being turned off; in some embodiments, after the terminal device is turned off, the general meter device monitors the operating state of the terminal device, selects the terminal device which enters the turning-on state from the turning-off state as a candidate device, and accumulates the number of times of turning on of the candidate device, for example, each time after the terminal device is turned off, the general meter device monitors which terminal device in the turning-off state is manually turned on by the user, and records the number of times of turning on of the terminal device accordingly.

In the S65, the pre-set turning on threshold may be customized by the user based on engineering experience.

In some embodiments, the S65 includes: determining whether the number of times of turning on is greater than or equal to a pre-set turning on threshold, if so, increasing the priority of the terminal device, and if not, maintaining the priority of the terminal device.

For example, referring to FIG. 3, the original priority of the third terminal device is the third priority, and the pre-set number of times of turning on is three; when the third terminal device is turned off for the first time, the third terminal device is manually turned on once by a user, and then the general meter device records 1. When the third terminal is turned off a second time, the third terminal device is manually turned on once by the user, whereupon the general meter device records 2. When the third terminal is turned off for the third time, the third terminal device is manually turned on once by the user, and then the general meter device records 3, and since the number of times of turning on is equal to the pre-set turning on threshold, the general meter device increases the priority of the third terminal device from the third priority to the second priority.

In this embodiment, the user's habit of turning on the corresponding terminal device is learned, and the turning off and turning on of the corresponding terminal device according to the user's habit is controlled, so that the overload monitoring strategy may be more in line with the user's habit, thereby improving the intelligence of the electric meter system and improving the user's experience.

In some embodiments, the power distribution data is stored in a cache ring configured in an electronic device, which may be a general meter device or other electronic product.

In some embodiments, the method for controlling a terminal device further includes: determining a count sequence to which the total power belongs; updating a count value of the count sequence according to a pre-set numerical value corresponding to the total power; mapping the total power into a cache ring; determining a target count sequence when detecting that the cache ring is full, where the target count sequence is at least one count sequence for counting the total power having an amplitude value greater than an overload power threshold; and calculating an overload trigger ratio according to the count value of the target count sequence and a storage length of the cache ring, where the count value of the target count sequence is a target number, and the storage length of the cache ring is the total number.

In some embodiments, the count sequence is used to store a count value, where different total powers may fall in different numerical ranges, and the count value is used to indicate the number of total powers that fall in the corresponding numerical range.

In some embodiments, the number of count sequence is at least two, and the count sequence is in one-to-one correspondence with the numerical range. For example, assuming that the total power is the total power, different total powers can fall in different numerical ranges, where the numerical ranges include a $0^{th}$ numerical range of 0-200 kw, a $1^{st}$ numerical range of 200 kw-250 kw, a $2^{nd}$ numerical range of 250 kw-300 kw and a $3^{rd}$ numerical range of 300 kw-∞, and the numerical ranges are in one-to-one correspondence with the count sequence, as shown in Table 2:

TABLE 2

| Numerical range | $0^{th}$ numerical range of 0-200 kw | $1^{st}$ numerical range of 200 kw-250 kw | $2^{nd}$ numerical range of 250 kw-300 kw | $3^{rd}$ numerical range of 300 kw-∞ |
|---|---|---|---|---|
| Count sequence | $0^{th}$ count sequence | $1^{st}$ count sequence | $2^{nd}$ count sequence | $3^{rd}$ count sequence |
| Count value | 0 | 0 | 0 | 0 |

It can be seen from Table 2 that the $0^{th}$ numerical range corresponds to the $0^{th}$ count sequence, the $1^{st}$ numerical range corresponds to the $1^{st}$ count sequence, the $2^{nd}$ numerical range corresponds to the $2^{nd}$ count sequence, and the $3^{rd}$ numerical range corresponds to the $3^{rd}$ count sequence. When the electric meter system is initialized, the count value of each count sequence is defaulted as 0.

When the electric meter system obtains the total power, the count sequence is selected according to the size of the total power, for example, when the total power is 3 kw, it corresponds to the $0^{th}$ count sequence. When the total power is 260 kw, it corresponds to the $2^{nd}$ count sequence, and so on, which will not be described in detail here.

In some embodiments, the pre-set numerical value is fixed during each monitoring, where the pre-set numerical value may be user-defined, such as a pre-set numerical value of 1 or 2 or 3, etc. In some embodiments, the pre-set numerical value is 1.

In some embodiments, the general meter device may map the total power into a cache ring according to a pre-set storage method, in some embodiments, the general meter device may store the total power directly into the cache ring, or the general meter device may store a data value associated with the total power into the cache ring.

In some embodiments, the overload power threshold corresponds to an overload level, and different overload levels correspond to different overload power thresholds, for example, when the overload level is the first overload level, the overload power threshold is 200 kw. When the overload level is the second overload level, the overload power threshold is 250 kw. When the overload level is the third overload level, the overload power threshold is 300 kw.

In an embodiment, a set of total powers are provided as follows:

$$W = \{50,62,210,234,240,260,280,268,274,320\}.$$

In an embodiment, the above set of total powers are sorted and counted as shown in Table 3:

TABLE 3

| Numerical range | $0^{th}$ numerical range of 0-200 kw | $1^{st}$ numerical range of 200 kw-250 kw | $2^{nd}$ numerical range of 250 kw-300 kw | $3^{rd}$ numerical range of 300 kw-∞ |
|---|---|---|---|---|
| Count sequence | $0^{th}$ count sequence | $1^{st}$ count sequence | $2^{nd}$ count sequence | $3^{rd}$ count sequence |
| Count value | 2 | 3 | 4 | 1 |

Assuming that the overload level is the first overload level, the overload power threshold is 200 kw. When the general meter device detects that all storage areas of the cache ring are filled after writing the $10^{th}$ total power "320" into the cache ring by the general meter device, the general meter device determines the target count sequence. As shown in Table 3, the count sequences for counting the total power having an amplitude greater than 200 kw are the first count sequence, the second count sequence and the third count sequence, respectively, and therefore, the first count sequence, the second count sequence and the third count sequence are all target count sequences.

Assuming that the overload level is the second overload level, the overload power threshold is 250 kw. When the general meter device detects that all storage areas of the cache ring are filled, the general meter device determines a target count sequence. As shown in Table 3, the count sequence for counting the total power having an amplitude greater than 250 kw are the second count sequence and the third count sequence, respectively, and therefore, the second count sequence and the third count sequence are both target count sequence.

Similarly, assuming that the overload level is the third overload level, the overload power threshold is 300 kw. When the general meter device detects that all storage areas of the cache ring are filled, the general meter device determines a target count sequence. As shown in Table 3, the count sequence for counting the total power having an amplitude of more than 300 kw is the third count sequence and therefore, the third count sequence is the target count sequence.

In some embodiments, the storage length is the number of storage areas in the cache line, where each storage area is used to store a total power. Referring to Table 3, assuming that the overload level is the first overload level, the count value of the target count sequence is the sum of the count values of the first count sequence, the second count sequence and the third count sequence, i.e., the count value of the target count sequence is 8.

As previously stated, since after the general meter device writes the $10^{th}$ total power "320" into the cache ring, the general meter device detects that all the storage areas of the cache ring are filled, the storage length of the cache ring is 10, and the general meter device can monitor the system according to the count value of the target count sequence and the storage length of the cache ring.

In the process of storing the total power in this embodiment, different total powers are classified into corresponding count sequences and counted; when the cache ring is full, the system is directly monitored according to the count value and the storage length of the target count sequence; on the one hand, a large number of repetitive operations such as sorting and judging needed later for counting are avoided, and thus the running time is relatively saved; on the other hand, since the storage length of the cache ring is known when the cache ring is full, it is not necessary to calculate how many total powers are stored in the cache ring, and thus the running time is relatively saved. Therefore, in this embodiment, running time may be relatively saved, which is beneficial to improve the low real-time performance of existing systems and improve the efficiency and real-time performance of the system.

In some embodiments, the storage length of the cache ring may be customized by the user to match the overload level set by the user. In some embodiments, the general meter device acquires sampling configuration information, where the sampling configuration information includes a sampling frequency and a specified time duration, and according to the sampling configuration information, a storage length of cache ring is configured, where the storage length is a product of the sampling frequency and the specified time duration, i.e., Len_Constant=Period×Freq, where Freq is the sampling frequency, and Period is the specified time duration.

The specified time duration is determined by the time duration defined from the start time point to the end time point, where the specified time duration may be customized by the user based on engineering experience, such as 1 minute (equivalent to 60 seconds) or 1 day (86400 seconds) or 7 days (604800 seconds).

In some embodiments, the determining the count sequence to which the total power belongs includes: determining a numerical range corresponding to the total power, and traversing a count sequence corresponding to a series index of the numerical range.

The numerical range is used to measure the fluctuation range of the total power, where the number of numerical ranges may be multiple, and as shown in Table 2, the numerical range is the $0^{th}$ numerical range, the $1^{st}$ numerical range, the $2^{nd}$ numerical range or the $3^{rd}$ numerical range.

The series index is a numerical range label identifying the corresponding numerical range. Since the numerical range corresponds to the count sequence on a one-to-one basis, the series index also corresponds to the count sequence on a one-to-one basis, and the count sequence may also be identified.

In an embodiment, Table 4 is provided as follows:

TABLE 4

| Numerical | $0^{th}$ numerical range of 0-200 kw | $1^{st}$ numerical range of 200 kw-250 kw | $2^{nd}$ numerical range of 250 kw-300 kw | $3^{rd}$ numerical range of 300 kw-∞ |
|---|---|---|---|---|
| Series index | index0 | Index1 | Index2 | Index3 |
| Count sequence | $0^{th}$ count sequence | $1^{st}$ count sequence | $2^{nd}$ count sequence | $3^{rd}$ count sequence |
| Count value | 0 | 0 | 0 | 0 |

It can be seen from Table 4 that after the general meter device determines the numerical range corresponding to the total power, the count sequence may be determined according to the series index of the numerical range, for example, corresponding to the total power "50", the numerical range corresponding thereto is the $0^{th}$ numerical range, and the series index of the $0^{th}$ numerical range is index0. Corresponding to the total power "210", the corresponding numerical range is the first numerical range, and the series index of the first numerical range is index1. Corresponding to the total power "260", the corresponding numerical range is the $2^{nd}$ numerical range, and the series index of the $2^{nd}$ numerical range is index2. Corresponding to the total power "320", the corresponding numerical range is the third numerical range, and the series index of the third numerical range is index3.

In some embodiments, the updating the count value of the count sequence according to the pre-set numerical value corresponding to the total power includes: reading a current count value of the count sequence, summing a pre-set numerical value corresponding to the total power and the current count value to obtain a summed result, and updating the current count value of the count sequence according to the summed result.

In some embodiments, the current count value is a count value at the current time. As previously mentioned, the pre-set numerical value is fixed during each monitoring, where the pre-set numerical value may be user-defined, such as a pre-set numerical value of 1 or 2 or 3, etc. In some embodiments, the pre-set numerical value is 1.

In some embodiments, referring to Table 3, assuming that the total power 240 is counted, the total power 240 corresponds to the first count sequence because the numerical range corresponding to the total power 240 is the first numerical range and the first numerical range is the first count sequence. When the general meter device counts the total power 240, the current count value of the first count sequence is 2. The general meter device sums a pre-set numerical value 1 corresponding to the total power and a current count value 2 to obtain a summed result 3. The general meter device updates "3" to the $1^{st}$ count sequence, so the updated current count value in the $1^{st}$ count sequence is 3.

In some embodiments, the cache ring is configured with a current pointer, and the current pointer is used for pointing to a storage area, and the mapping the total power into the cache ring includes: determining a mapping value according to the total power, reading a storage area pointed by the current pointer, to obtain a returned value, and storing the mapping value in the storage area pointed by the current pointer.

In some embodiments, the mapping value includes a total power, and the determining the mapping value according to the total power includes: taking the total power as the mapping value.

In some embodiments, the mapping value includes a series index of numerical ranges corresponding to the total power, and the determining the mapping value according to the total power includes: determining a numerical range corresponding to the total power, and taking a series index of the numerical range as a mapping value.

The storage area is used for storing a total power or a data value associated with the total power, and the returned value is a value that has been stored in the storage area before the total power or the data value associated with the total power is stored, where the returned value may be the total power before coverage or null.

The general meter device stores the total power in the storage area pointed to by the current pointer.

In some embodiments, after storing the mapping value in a storage area pointed by the current pointer, updating the current pointer according to a pre-set numerical value to obtain an updated current pointer, and judging whether the updated current pointer is greater than the maximum pointer; if so, changing the updated current pointer to the minimum pointer; and if not, maintaining the updated current pointer.

In some embodiments, the pre-set numerical value is added to the current pointer to obtain a summed result, and the summed result is used as the updated current pointer.

In some embodiments, the maximum pointer is the largest pointer in the cache ring, where the maximum pointer may be customized by the user, as in Table 5 provided below, the maximum pointer is H09.

In some embodiments, the minimum pointer is the pointer with the minimum pointer in the cache ring, where the minimum pointer may be customized by a user, as in Table 5 provided below, the minimum pointer is H00, and when the current pointer exceeds the maximum pointer, in order to achieve ring storage purposes, the current pointer needs to be restored to the starting pointer, i.e., to the minimum pointer.

In some embodiments, since the updated current pointer is less than or equal to the maximum pointer, there is no need to restore the current pointer, but only to maintain the updated current pointer.

To elaborate the embodiments provided above, Table 5 is provided below to elaborate the process of storing the total power in the buffer ring.

TABLE 5

| Pointer | Area number of storage area | Mapping value of storage area | Point of pointer |
|---|---|---|---|
| H09 | $9^{th}$ storage area | 320 | |
| H08 | $8^{th}$ storage area | 274 | |
| H07 | $7^{th}$ storage area | 268 | |
| H06 | $6^{th}$ storage area | 280 | |
| H05 | $5^{th}$ storage area | 260 | |
| H04 | $4^{th}$ storage area | 240 | |
| H03 | $3^{rd}$ storage area | 234 | |
| H02 | $2^{nd}$ storage area | 210 | |
| H01 | $1^{st}$ storage area | 62 | |
| H00 | $0^{th}$ storage area | 50 | ← |

In Table 5, the mapping value is the total power, i.e., the general meter device stores the total power as the mapping value in the corresponding storage area.

As shown in Table 5, the cache ring has a storage length of 10, the current pointer is H00 at initialization, and each storage area in the cache ring is null.

When the total power "50" is written to the cache ring, the general meter device reads the $0^{th}$ storage area pointed to by the current pointer "H00", obtains the returned value "null", and stores the total power "50" in the $0^{th}$ storage area. The general meter device adds the current pointer "H00" to the pre-set numerical value "1" to obtain "H01", and therefore, the updated current pointer is "H01", in other words, the current pointer has jumped from pointing to the $0^{th}$ storage area to pointing to the $1^{st}$ storage area. Since the updated current pointer "H01" is not greater than the maximum pointer "H09", the general meter device maintains the updated current pointer "H01".

When the total power "62" is written to the cache ring, the general meter device reads the first storage area pointed to by the current pointer "H01", the returned value "null", and stores the total power "62" in the first storage area. The general meter device adds the current pointer "H01" to the pre-set numerical value "1" to obtain "H02", and thus the updated current pointer is "H02", in other words, the current pointer has jumped from pointing to the first storage area to pointing to the second storage area. Since the updated current pointer "H02" is not greater than the maximum pointer "H09", the general meter device maintains the updated current pointer "H02", and so on.

When the total power "320" is written to the cache ring, the general meter device reads the ninth storage area pointed to by the current pointer "H09", obtains the returned value "null", and stores the total power "320" in the ninth storage area. The general meter device adds the current pointer "H09" to the pre-set numerical value "1" to obtain "H10", and thus the updated current pointer is "H10". Since the updated current pointer "H10" is greater than the maximum pointer "H09", the general meter device changes the updated current pointer "H10" to the minimum pointer "H00", i.e., the current pointer has jumped from pointing to the $9^{th}$ storage area to pointing to the $0^{th}$ storage area before; therefore, in this embodiment, the total power may be circularly stored under a specified storage length, or under a limited storage length; thus, it can also be seen that in the monitoring process, this embodiment also does not need a large number of repeated calculation of the total power, which is beneficial to improve the operating efficiency and real-time performance of the system.

In some embodiments, different from the embodiments provided in Table 5, the mapping values in Table 6 are the series index of the numerical range corresponding to the total power.

TABLE 6

| Pointer | Area number of storage area | Mapping value of storage area | Point of pointer |
|---|---|---|---|
| H09 | $9^{th}$ storage area | Index3 | |
| H08 | $8^{th}$ storage area | Index2 | |
| H07 | $7^{th}$ storage area | Index2 | |
| H06 | $6^{th}$ storage area | Index2 | |
| H05 | $5^{th}$ storage area | Index2 | |
| H04 | $4^{th}$ storage area | Index1 | |
| H03 | $3^{rd}$ storage area | Index1 | |
| H02 | $2^{nd}$ storage area | Index1 | |
| H01 | $1^{st}$ storage area | index0 | |
| H00 | $0^{th}$ storage area | index0 | ← |

As shown in Table 6, Table 6 differs from Table 5 in that Table 5 directly stores the total power in the storage area, while Table 6 stores the numerical series index of the numerical range corresponding to the total power in the storage area, as illustrated below:

When the total power "50" is written into the cache ring, the general meter device determines that the numerical range corresponding to the total power "50" is the $0^{th}$ numerical range, the series index of the $0^{th}$ numerical range is index0, and stores the index0 in the $0^{th}$ storage area.

When the total power "210" is written into the cache ring, the general meter device determines that the numerical range corresponding to the total power "210" is a first numerical range, and the numerical series index of the first numerical range is index1, and stores the index1 in a second storage area.

In some embodiments, when detecting that the cache ring is full, a count sequence to which a returned value belongs is determined; the returned value is a mapping value reading pointing of a current pointer in the cache ring; a current count value of the count sequence to which the returned value belongs is subtracted from a pre-set numerical value to obtain a subtraction result; and the current count value of the count sequence to which the returned value belongs is updated according to the subtraction result.

In some embodiments, when it is detected whether the cache ring is full, it is determined that the cache ring is full if the current pointer of the cache ring is greater than the maximum pointer. If the current pointer of the cache ring is less than or equal to the maximum pointer, it is determined that the cache ring is not full.

In some embodiments, the difference with the above-mentioned embodiments is that when detecting whether the cache ring is full, the general meter device acquires a returned value, and judges whether the returned value is an initialized numerical value, if so, the cache ring is not full, and if not, the cache ring is full, where the initialized numerical value is the initialized value of the cache ring, and the initialized numerical value can be customized by a user, for example, the initialized numerical value is null or 0.

As previously described, the mapping value is the series index or the total power of the numerical range corresponding to the total power, and therefore, the returned value may be the series index or the total power.

In some embodiments, when the returned value is total power, please refer to Table 5 to assume that the general meter device continues to store total power "220" after it has stored a set of total power W={50, 62, 210, 234, 240, 260, 280, 268, 274, 320}. After the total power "320" is stored in the ninth storage area pointed by the current pointer "H09", the general meter device updates the current pointer according to a pre-set numerical value to obtain an updated current pointer, i.e., the updated current pointer=current pointer+1=H09+1=H10. Since the new current pointer "H10" is greater than the maximum pointer "H09", the updated current pointer "H10" is changed to the minimum pointer "H00".

In general, after the total power "320" is stored in the ninth storage area pointed to by the current pointer "H09", the last current pointer is H00.

When the total power "220" is stored, the general meter device reads the mapping value that the current pointer "H00" points to in the cache ring, i.e., reads the total power that the current pointer "H00" points to. As can be seen from Table 5, the total power pointed to by the current pointer "H00" is "50", i.e., the returned value R0=50.

Since "50" is not the initialized numerical value, the general meter device detects that the cache ring is full, and then the general meter device determines the count sequence to which the returned value R0=50 belongs. As can be seen from Table 3, the count sequence to which the returned value R0=50 belongs is listed as the $0^{th}$ count sequence.

It will be appreciated that after the total power "320" has been stored, i.e., when the cache ring is filled, the current count value of the $0^{th}$ count sequence is 2.

The general meter device subtracts the current count value 2 of the $0^{th}$ count sequence to which the returned value R0=50 belongs from the pre-set numerical value 1 to obtain a subtraction result 1.

The general meter device updates the count value of the $0^{th}$ count sequence to which the returned value R0=50 belongs according to the subtraction result 1, and finally the current count value of the $0^{th}$ count sequence is 1.

And so on . . . . Under the premise that the cache ring is full, when a new total power is loaded into the cache ring, in a first-in first-out manner, the old total power will be continuously discarded, and the new total power will be continuously filled, and the storage length of the cache ring is taken as the cycle length to continuously work normally.

In addition, in this embodiment, the pre-set numerical value of the old total power in the corresponding count sequence can be automatically and skillfully deleted, thereby also ensuring that the count sequence can reflect the change of the total power, and ensuring that the system can be monitored reliably and accurately.

In some embodiments, when the returned value is a data index, please refer to Table 6 to assume that the general meter device continues to store total power "220" after it has stored a set of total power W={50, 62, 210, 234, 240, 260, 280, 268, 274, 320}.

When the total power "220" is stored, the general meter device reads the mapping value that the current pointer "H00" points to in the cache ring, i.e., reads the total power that the current pointer "H00" points to. As can be seen from Table 6, the data index pointed to by the current pointer "H00" is "index0", i.e., the returned value R0=index0.

Since "index0" is not the initialized numerical value, the general meter device detects that the cache ring is full, and then the general meter device determines the count sequence to which the returned value R0=index0 belongs. As can be seen from Table 4, the count sequence to which the returned value R0=index0 belongs is listed as the $0^{th}$ count sequence.

The general meter device subtracts the current count value 2 of the $0^{th}$ count sequence to which the returned value RO=index0 belongs from the pre-set numerical value 1 to obtain a subtraction result 1.

The general meter device updates the count value of the $0^{th}$ count sequence to which the returned value RO=index0 belongs according to the subtraction result 1, and finally the current count value of the $0^{th}$ count sequence is 1.

In contrast to the first way of storing the total power directly as a mapping value in the buffer ring, this embodiment uses the second way of storing the series index as a mapping value in the buffer ring. Since each count sequence is identified by using a series index, in the first mode, when the returned value is the total power, the general meter device needs to firstly judge in which numerical range the total power falls, then determine the series index of the numerical range, and finally find the count sequence according to the series index.

In a second mode, when the returned value is the series index, the general meter device directly searches for the count sequence according to the series index, and thus the corresponding judgement step can be further reduced, which is beneficial to improve the update efficiency of the current count value of the count sequence.

In some embodiments, the calculating the overload trigger ratio according to the count value of the target count sequence and the storage length of the cache ring includes: summing a current count value of at least one target count sequence to obtain a total count value, and calculating an overload trigger ratio according to the total count value and a storage length of a cache ring.

In some embodiments, when the number of target count sequence is 1, the current count value of the target count sequence is a total count value. When the number of target count sequence is two or more, the total count value is the sum of the current count values of all the target count sequences.

In some embodiments, the general meter device calculates the overload trigger ratio according to the following formula: $\psi=P/L$, where W is the overload trigger ratio, P is the total count value, and L is the storage length.

In the above-mentioned various embodiments, there is not necessarily a certain sequential order between the above-mentioned various steps, and a person skilled in the art would have been able to understand according to the description of the embodiments of the present disclosure that in different embodiments, the above-mentioned various steps can be performed in a different order, i.e., can be performed in parallel, can be performed in exchange, etc.

FIG. 11 is a schematic structural diagram showing circuit of a general meter device provided in the embodiment of the present disclosure. As shown in FIG. 11, the general meter device 110 includes one or more processors 1101 and a memory 1102. One processor 1101 is exemplified in FIG. 11.

The processors 1101 and the memory 1102 may be connected via a bus or in other ways, and via a bus connection exemplified in FIG. 11.

The memory 1102 is a nonvolatile computer-readable storage medium that can be used to store a nonvolatile software program, a nonvolatile computer-executable program, and modules, such as program instructions/modules corresponding to the method for controlling the terminal device in the embodiment of the present disclosure. The processor 131 executes various functional applications of the control apparatus of the terminal device and data processing, i.e., functions implementing the method for controlling the terminal device provided by the above-described method embodiment, by executing the non-volatile software programs, instructions and modules stored in the memory 1102.

The memory 1102 may include high-speed random-access memory, and may also include non-volatile memory, such as at least one magnetic disk storage device, flash memory device, or other non-volatile solid state storage device. In some embodiments, the memory 1102 may optionally include memories remotely located with respect to a processor 1101, which may be connected to the processor 1101 via a network. Examples of such networks include, but are not limited to, the Internet, intranets, local area networks, mobile communication networks, and combinations thereof.

The program instructions/modules are stored in the memory 1102 and when executed by the one or more processors 1101 perform the method for controlling the terminal device in any of the method embodiments described above.

The embodiment of the present disclosure also provides a control apparatus of a terminal device, the control apparatus operating in an electric meter system, the electric meter system being capable of detecting the power of each of the terminal devices, the control apparatus including:

a determining portion configured to determine power distribution data of a plurality of terminal devices, where the power distribution data includes the total power of all sampling time points within a specified time duration, and the total power is the sum of the power of the terminal devices at each of the sampling time points;

a judging portion configured to determine whether the power distribution data meets a power overload condition; and a control portion configured to control each terminal device according to the priority of the terminal device when the power distribution data meets the power overload condition.

Embodiments of the present disclosure also provide a non-volatile computer-readable storage medium having stored thereon computer-executable instructions that, when executed by one or more processors, such as one processor 1101 in FIG. 11, may cause the one or more processors to perform the method for controlling the terminal device in any of the method embodiments described above.

Embodiments of the present disclosure also provide a computer program product including a computer program stored on a non-volatile computer-readable storage medium, the computer program including program instructions which, when executed by a general meter device, cause the general meter device to perform the above-mentioned method for controlling a terminal device.

The apparatus or device embodiments described above are merely illustrative, where the units or modules illustrated as separate components may or may not be physically separated, and the components shown as modular units may or may not be physical units, i.e., may be located in one place, or may also be distributed over multiple network modular units. Some or all the modules may be selected according to actual needs to achieve the purpose of the solutions of various embodiments.

From the above description of the embodiments, the embodiments can be implemented by means of software plus a general-purpose hardware platform, but also by means of hardware. With this in mind, some of the above-described aspects in essence or in a contribution to the art may be embodied in the form of a software product, which may be stored on a computer-readable storage medium, such as an ROM/RAM, magnetic diskette, compact disk, etc. containing instructions for causing a computer device, which may be a personal computer, a server, or a network appliance, etc. to perform the methods of the various embodiments or portions of the embodiments.

The above description is directed to exemplify embodiments of the present disclosure, and the scope of protection of the present disclosure is not limited thereto, and changes or substitutions thereof are intended to be within the scope of protection of the present disclosure. Therefore, the scope of protection of the present disclosure should be determined by the scope of the claims.

What is claimed is:

1. A method for controlling at least one terminal device of a plurality of terminal devices, comprising:

determining, by an electric meter system capable of detecting power of each of the plurality of terminal devices, power distribution data of the plurality of terminal devices, wherein the power distribution data comprises a total power of all sampling time points within a specified time duration, and the total power is a sum of the power of the plurality of terminal devices at each of the sampling time points;

determining, by the electric meter system, whether the power distribution data meets a power overload condition; and in response to determining, by the electric meter system, that the power distribution data meets the power overload condition, controlling, by the electric meter system, the at least one terminal device according to a priority of the at least one terminal device of the plurality of terminal devices;

wherein determining whether the power distribution data meets the power overload condition comprises:

calculating an overload trigger ratio of the electric meter system according to the power distribution data; and determining whether the power distribution data meets the power overload condition according to the overload trigger ratio and a pre-set overload ratio.

2. The method according to claim 1, wherein calculating the overload trigger ratio of the electric meter system according to the power distribution data comprises:

determining a target number of the electric meter system and a total number of the total power according to the power distribution data, wherein the target number is a sum of numbers of the total power greater than an overload power threshold; and calculating the overload trigger ratio of the electric meter system according to the total number and the target number.

3. The method according to claim 2, before determining the power distribution data, further comprising:

acquiring, by the electric meter system, overload configuration information of the electric meter system, wherein the overload configuration information comprises a target overload level of the electric meter system;

selecting, by the electric meter system, a reference power threshold, a reference time duration and a reference overload ratio corresponding to the target overload level according to the overload configuration information; and taking, by the electric meter system, the reference power threshold as the overload power threshold, taking the reference time duration as the specified time duration, and taking the reference overload ratio as the pre-set overload ratio.

4. The method according to claim 1, wherein determining whether the power distribution data meets the power overload condition according to the overload trigger ratio and a pre-set overload ratio comprises:

determining whether the overload trigger ratio of the power distribution data is greater than or equal to the pre-set overload ratio.

5. The method according to claim 1, wherein controlling the at least one terminal device according to the priority of the at least one terminal device comprises:

progressively turning off the at least one terminal device in a priority order of from low to high.

6. The method according to claim 5, wherein progressively turning off the at least one terminal device in the priority order of from low to high comprises:

searching for a terminal device with a lowest priority among all terminal devices currently in an operating state; and turning off the terminal device with the lowest priority.

7. The method according to claim 6, after turning off the terminal device with the lowest priority, further comprising:

clearing, by the electric meter system, power distribution data corresponding to the specified time duration; and proceeding, by the electric meter system, to determine next power distribution data for the electric meter system.

8. The method according to claim 6, after turning off the terminal device with the lowest priority, further comprising:

acquiring, by the electric meter system, short-time distribution data, wherein the short-time distribution data comprises a total power of each of the plurality of terminal devices at each of sampling time points within a target time duration, wherein the target time duration is less than the specified time duration;

determining, by the electric meter system, whether the short-time distribution data meets an override alarm condition;

in response to determining, by the electric meter system, that the short-time distribution data meets the override alarm condition, generating, by the electric meter system, override alarm information; and in response to determining, by the electric meter system, that the short-time distribution data does not meet the override alarm condition, recording, by the electric meter system, the total power at each of the sampling time points within the target time duration.

9. A non-transitory computer-readable storage medium, storing computer-executable instructions for causing an electronic device to perform acts comprising:

determining power distribution data of a plurality of terminal devices, wherein the power distribution data comprises a total power of all sampling time points within a specified time duration, and the total power is a sum of power of the plurality of terminal devices at each of the sampling time points;

determining whether the power distribution data meets a power overload condition; and in response to determining that the power distribution data meets the power overload condition, controlling at least one terminal device of the plurality of terminal devices according to a priority of the at least one terminal device of the plurality of terminal devices;

wherein determining whether the power distribution data meets the power overload condition comprises:

calculating an overload trigger ratio of the electric meter system according to the power distribution data; and determining whether the power distribution data meets the power overload condition according to the overload trigger ratio and a pre-set overload ratio.

10. The non-transitory computer-readable storage medium according to claim 9, wherein calculating the overload trigger ratio of the electric meter system according to the power distribution data comprises:

determining a target number of the electric meter system and a total number of the total power according to the power distribution data, wherein the target number is a sum of numbers of the total power greater than an overload power threshold; and calculating the overload trigger ratio of the electric meter system according to the total number and the target number.

11. The non-transitory computer-readable storage medium according to claim 9, wherein determining whether the power distribution data meets the power overload condition according to the overload trigger ratio and a pre-set overload ratio comprises:

determining whether the overload trigger ratio of the power distribution data is greater than or equal to the pre-set overload ratio.

12. The non-transitory computer-readable storage medium according to claim 11, before determining the power distribution data, further comprising:

acquiring, by the electric meter system, overload configuration information of the electric meter system, wherein the overload configuration information comprises a target overload level of the electric meter system;

selecting, by the electric meter system, a reference power threshold, a reference time duration and a reference overload ratio corresponding to the target overload level according to the overload configuration information; and taking, by the electric meter system, the reference power threshold as the overload power threshold, taking the reference time duration as the specified time duration, and taking the reference overload ratio as the pre-set overload ratio.

13. A general meter device, comprising:

at least one processor; and a memory in communication connection with the at least one processor; wherein the memory stores instructions executable by the at least one processor, and the instructions are executed by the at least one processor to cause the at least one processor to perform acts comprising:

determining power distribution data of a plurality of terminal devices, wherein the power distribution data comprises a total power of all sampling time points within a specified time duration, and the total power is a sum of power of the plurality of terminal devices at each of the sampling time points;

determining whether the power distribution data meets a power overload condition; and in response to determining that the power distribution data meets the power overload condition, controlling at least one terminal device of the plurality of terminal devices according to a priority of the at least one terminal device of the plurality of terminal devices;

wherein determining whether the power distribution data meets the power overload condition comprises:

calculating an overload trigger ratio of the electric meter system according to the power distribution data; and determining whether the power distribution data meets the power overload condition according to the overload trigger ratio and a pre-set overload ratio.

14. The general meter device according to claim 13, wherein calculating the overload trigger ratio of the electric meter system according to the power distribution data comprises:

determining a target number of the electric meter system and a total number of the total power according to the power distribution data, wherein the target number is a sum of numbers of the total power greater than an overload power threshold; and calculating the overload trigger ratio of the electric meter system according to the total number and the target number.

15. The general meter device according to claim 14, before determining the power distribution data, further comprising:

acquiring, by the electric meter system, overload configuration information of the electric meter system, wherein the overload configuration information comprises a target overload level of the electric meter system;

selecting, by the electric meter system, a reference power threshold, a reference time duration and a reference overload ratio corresponding to the target overload level according to the overload configuration information; and taking, by the electric meter system, the reference power threshold as the overload power threshold, taking the reference time duration as the specified time duration, and taking the reference overload ratio as the pre-set overload ratio.

16. The general meter device according to claim 13, wherein determining whether the power distribution data meets the power overload condition according to the overload trigger ratio and a pre-set overload ratio comprises:

determining whether the overload trigger ratio of the power distribution data is greater than or equal to the pre-set overload ratio.

17. The general meter device according to claim 13, wherein controlling the at least one terminal device according to the priority of the at least one terminal device comprises:

progressively turning off the at least one terminal device in a priority order of from low to high.

18. The general meter device according to claim 17, wherein progressively turning off the at least one terminal device in the priority order of from low to high comprises:

searching for a terminal device with a lowest priority among all terminal devices currently in an operating state; and turning off the terminal device with the lowest priority.

19. The general meter device according to claim 18, after turning off the terminal device with the lowest priority, further comprising:

clearing, by the electric meter system, power distribution data corresponding to the specified time duration; and proceeding, by the electric meter system, to determine next power distribution data for the electric meter system.

20. The general meter device according to claim 18, after turning off the terminal device with the lowest priority, further comprising:

acquiring, by the electric meter system, short-time distribution data, wherein the short-time distribution data comprises a total power of each of the plurality of terminal devices at each of sampling time points within a target time duration, wherein the target time duration is less than the specified time duration;

determining, by the electric meter system, whether the short-time distribution data meets an override alarm condition;

in response to determining, by the electric meter system, that the short-time distribution data meets the override alarm condition, generating, by the electric meter system, override alarm information; and in response to determining, by the electric meter system, that the short-time distribution data does not meet the override alarm condition, recording, by the electric meter system, the total power at each of the sampling time points within the target time duration.

* * * * *